(12) United States Patent
Tsunoya et al.

(10) Patent No.: US 10,611,137 B2
(45) Date of Patent: Apr. 7, 2020

(54) THREE-DIMENSIONAL SHAPED ARTICLE PRODUCTION METHOD, THREE-DIMENSIONAL SHAPED ARTICLE PRODUCTION APPARATUS, AND THREE-DIMENSIONAL SHAPED ARTICLE

(71) Applicant: Seiko Epson Corporation, Tokyo (JP)

(72) Inventors: Akihiko Tsunoya, Okaya (JP); Eiji Okamoto, Matsumoto (JP)

(73) Assignee: Seiko Epson Corporation (JP)

( * ) Notice: Subject to any disclaimer, the term of this patent is extended or adjusted under 35 U.S.C. 154(b) by 258 days.

(21) Appl. No.: 15/441,624

(22) Filed: Feb. 24, 2017

(65) Prior Publication Data

US 2017/0252977 A1 Sep. 7, 2017

(30) Foreign Application Priority Data

Mar. 7, 2016 (JP) .................. 2016-043674

(51) Int. Cl.
*B33Y 10/00* (2015.01)
*B33Y 30/00* (2015.01)
(Continued)

(52) U.S. Cl.
CPC .............. *B33Y 10/00* (2014.12); *B22F 3/008* (2013.01); *B28B 1/001* (2013.01); *B29C 64/112* (2017.08); *B29C 64/165* (2017.08); *B29C 64/20* (2017.08); *B29C 64/386* (2017.08); *B33Y 30/00* (2014.12); *B33Y 50/02* (2014.12); *C04B 35/01* (2013.01); *C04B 35/053* (2013.01);
(Continued)

(58) Field of Classification Search
CPC ....... B33Y 10/00; B33Y 50/05; B29C 64/112; B29C 64/386
See application file for complete search history.

(56) References Cited

U.S. PATENT DOCUMENTS 5,260,009 A 11/1993 Penn
5,594,652 A 1/1997 Penn et al.
(Continued)

FOREIGN PATENT DOCUMENTS

EP 0 581 445 A1 2/1994
EP 2 902 174 A1 8/2015
(Continued)

*Primary Examiner* — Kelly M Gambetta
(74) *Attorney, Agent, or Firm* — Harness, Dickey & Pierce, P.L.C.

(57) ABSTRACT

A three-dimensional shaped article production method includes a layer formation step of forming a layer by ejecting a composition containing particles and a solvent in a predetermined pattern using a dispenser, a measurement step of determining the height of the layer, and a bonding step of subjecting a stacked body including a plurality of layers to a bonding treatment for bonding the particles, wherein when n represents an arbitrary integer of 1 or more, by selecting driving waveform data for the dispenser when ejecting the composition from a data group including a plurality of pieces of driving waveform data based on the information of the height of the layer in the n-th position (n-th layer) determined in the measurement step, the ejection amount of the composition per unit area onto the n-th layer in the layer formation step of forming the layer in the (n+1)th position ((n+1)th layer) is adjusted.

5 Claims, 9 Drawing Sheets

(51) Int. Cl.
| | |
|---|---|
| B33Y 50/02 | (2015.01) |
| B22F 3/00 | (2006.01) |
| B28B 1/00 | (2006.01) |
| B29C 64/112 | (2017.01) |
| B29C 64/20 | (2017.01) |
| C04B 35/453 | (2006.01) |
| B29C 64/386 | (2017.01) |
| C04B 35/484 | (2006.01) |
| C04B 35/20 | (2006.01) |
| C04B 35/565 | (2006.01) |
| C04B 35/053 | (2006.01) |
| C04B 35/58 | (2006.01) |
| C04B 35/46 | (2006.01) |
| C04B 35/547 | (2006.01) |
| C04B 35/14 | (2006.01) |
| C04B 35/581 | (2006.01) |
| C04B 35/56 | (2006.01) |
| C04B 35/457 | (2006.01) |
| C04B 35/462 | (2006.01) |
| C04B 35/584 | (2006.01) |
| C04B 35/22 | (2006.01) |
| C04B 35/01 | (2006.01) |
| C04B 35/447 | (2006.01) |
| B29C 64/165 | (2017.01) |
| C04B 35/111 | (2006.01) |
| B29K 105/00 | (2006.01) |

(52) U.S. Cl.
CPC ............ *C04B 35/111* (2013.01); *C04B 35/14* (2013.01); *C04B 35/20* (2013.01); *C04B 35/22* (2013.01); *C04B 35/447* (2013.01); *C04B 35/453* (2013.01); *C04B 35/457* (2013.01); *C04B 35/46* (2013.01); *C04B 35/462* (2013.01); *C04B 35/484* (2013.01); *C04B 35/547* (2013.01); *C04B 35/565* (2013.01); *C04B 35/5611* (2013.01); *C04B 35/581* (2013.01); *C04B 35/584* (2013.01); *C04B 35/58014* (2013.01); *B22F 2998/10* (2013.01); *B22F 2999/00* (2013.01); *B29K 2105/251* (2013.01); *C04B 2235/6026* (2013.01)

(56) References Cited

U.S. PATENT DOCUMENTS

| | | | |
|---|---|---|---|
| 6,169,605 | B1 | 1/2001 | Penn et al. |
| 6,175,422 | B1 | 1/2001 | Penn et al. |
| 9,738,032 | B2 | 8/2017 | Folkins et al. |
| 2002/0008335 | A1* | 1/2002 | Leyden .................. B29C 41/12 264/494 |
| 2006/0158456 | A1 | 7/2006 | Zinniel et al. |
| 2006/0172168 | A1 | 8/2006 | Wright et al. |
| 2010/0040767 | A1 | 2/2010 | Uibel et al. |
| 2015/0210011 | A1* | 7/2015 | Conrow ................ B29C 64/386 264/40.4 |
| 2015/0266242 | A1* | 9/2015 | Comb .................. B29C 64/393 264/40.1 |
| 2015/0298394 | A1 | 10/2015 | Sheinman |
| 2015/0352781 | A1 | 12/2015 | Hosier et al. |
| 2015/0352839 | A1 | 12/2015 | Folkins et al. |
| 2017/0008231 | A1 | 1/2017 | Hirabayashi et al. |
| 2018/0229425 | A1 | 8/2018 | Sheinman |

FOREIGN PATENT DOCUMENTS

| | | |
|---|---|---|
| JP | H07-040445 A | 2/1995 |
| JP | 11-042714 A | 2/1999 |
| JP | 2003-181941 A | 7/2003 |
| JP | 2005-138422 A | 6/2005 |
| JP | 2005-335203 A | 12/2005 |
| JP | 2008-184622 A | 8/2008 |
| JP | 2012-030530 A | 2/2012 |
| JP | 2013-075392 A | 4/2013 |
| JP | 2015-196267 A | 11/2015 |
| JP | 2015-212060 A | 11/2015 |
| JP | 2016-011331 A | 1/2016 |
| WO | WO-2015-056230 A1 | 4/2015 |

* cited by examiner

THREE-DIMENSIONAL SHAPED ARTICLE PRODUCTION METHOD, THREE-DIMENSIONAL SHAPED ARTICLE PRODUCTION APPARATUS, AND THREE-DIMENSIONAL SHAPED ARTICLE

BACKGROUND

1. Technical Field

The present invention relates to a three-dimensional shaped article production method, a three-dimensional shaped article production apparatus, and a three-dimensional shaped article.

2. Related Art

There has been known a method for forming a three-dimensional shaped article based on the model data of a three-dimensional object formed using, for example, a three-dimensional CAD software, a three-dimensional scanner, or the like.

As a method for forming a three-dimensional shaped article, there has been known a stacking method (three-dimensional shaping method). In the stacking method, in general, after the model data of a three-dimensional object is divided into a large number of two-dimensional cross-sectional layer data (slice data), while sequentially shaping cross-sectional members corresponding to the respective two-dimensional cross-sectional layer data, the cross-sectional members are sequentially stacked, whereby a three-dimensional shaped article is formed.

According to the stacking method, a three-dimensional shaped article can be immediately formed as long as there is model data of a three-dimensional shaped article to be shaped, and it is not necessary to form a mold or the like prior to shaping, and therefore, it is possible to form a three-dimensional shaped article rapidly at low cost. Further, since the formation is performed by staking the layers of thin plate-shaped cross-sectional members one by one, even a complicated object having, for example, an internal structure can be formed as an integrated shaped article without being divided into a plurality of components.

As such a stacking method, there has been known a technique for producing a three-dimensional shaped article by repeating a process for forming a film (layer) by ejecting a material (slurry) containing a powder and a solvent from a dispenser (see, for example, JP-A-2015-196267 (Patent Document 1)).

However, in such a stacking method, the thickness of a layer to be formed sometimes deviates from a target value. Such a deviation of the thickness causes a decrease in the dimensional accuracy of the three-dimensional shaped article. In particular, by accumulating the deviation of the thickness due to stacking of layers, the dimensional accuracy of the finally obtained three-dimensional shaped article is sometimes greatly decreased. Such a problem occurs more significantly when the number of stacked layers is large.

SUMMARY

An advantage of some aspects of the invention is to provide a three-dimensional shaped article production method capable of efficiently producing a three-dimensional shaped article having high dimensional accuracy, to provide a three-dimensional shaped article production apparatus capable of efficiently producing a three-dimensional shaped article having high dimensional accuracy, and to provide a three-dimensional shaped article having high dimensional accuracy.

The advantage can be achieved by the following configurations.

A three-dimensional shaped article production method according to an aspect of the invention is a method for producing a three-dimensional shaped article by stacking layers and includes a layer formation step of forming each layer by ejecting a composition containing particles and a solvent in a predetermined pattern using a dispenser, a measurement step of determining the height of the layer, and a bonding step of subjecting a stacked body including a plurality of layers to a bonding treatment for bonding the particles, wherein when n represents an arbitrary integer of 1 or more, by selecting driving waveform data for the dispenser when ejecting the composition from a data group including a plurality of pieces of driving waveform data based on the information of the height of an n-th layer which is the layer in the n-th position determined in the measurement step, the ejection amount of the composition per unit area onto the n-th layer in the layer formation step of forming an (n+1)th layer which is the layer in the (n+1)th position is adjusted.

According to this configuration, a three-dimensional shaped article production method capable of efficiently producing a three-dimensional shaped article having high dimensional accuracy can be provided.

In the three-dimensional shaped article production method according to the aspect of the invention, it is preferred that in the measurement step, the height is determined in a plurality of places where the (n+1)th layer is to be stacked in the surface of the n-th layer, and the ejection amount of the composition per unit area in the layer formation step of forming the (n+1)th layer is adjusted so that the film thickness becomes a desired film thickness with the n-th layer and the (n+1)th layer.

According to this configuration, the dimensional accuracy of the three-dimensional shaped article can be further enhanced.

In the three-dimensional shaped article production method according to the aspect of the invention, it is preferred that the data group includes reference driving waveform data for a predetermined ejection amount, driving waveform data for a decreased amount such that the ejection amount is smaller than that in the case of using the reference driving waveform data, and driving waveform data for an increased amount such that the ejection amount is larger than that in the case of using the reference driving waveform data, and in the layer formation step of forming the n-th layer, the reference driving waveform data is used, and in the layer formation step of forming the (n+1)th layer, the ejection amount of the composition per unit area is adjusted by using at least one of the driving waveform data for a decreased amount and the driving waveform data for an increased amount.

According to this configuration, the dimensional accuracy of the three-dimensional shaped article can be further enhanced.

In the three-dimensional shaped article production method according to the aspect of the invention, it is preferred that the measurement step for the n-th layer is performed after performing a solvent removal step of removing the solvent from the n-th layer.

According to this configuration, the effect of the deformation (change in the thickness) of the n-th layer after performing the measurement step can be prevented, and the application amount of the composition in the layer formation step of forming the (n+1)th layer can be more appropriately determined. As a result, the dimensional accuracy of the three-dimensional shaped article can be further enhanced.

In the three-dimensional shaped article production method according to the aspect of the invention, it is preferred that the composition further contains a binder having a function to temporarily bond the particles in the layer in which the solvent has been removed in addition to the particles and the solvent.

According to this configuration, the dimensional accuracy of the three-dimensional shaped article can be further enhanced. In addition, the void ratio (porosity) in the three-dimensional shaped article, the density of the three-dimensional shaped article, and the like can be favorably adjusted.

In the three-dimensional shaped article production method according to the aspect of the invention, it is preferred that the composition contains particles constituted by a material containing at least one of a metal material and a ceramic material as the particles.

According to this configuration, for example, the texture (luxurious texture), mechanical strength, durability, and the like of the three-dimensional shaped article can be further enhanced.

A three-dimensional shaped article production apparatus according to an aspect of the invention includes a dispenser which ejects a composition containing particles and a solvent, a measurement unit which determines the height of a layer formed using the composition, and a control section which controls the ejection amount of the composition from the dispenser, wherein the control section is configured to adjust the ejection amount of the composition per unit area onto the layer whose height has been measured by selecting driving waveform data to be input to the dispenser from a memory section including a plurality of pieces of driving waveform data based on the result of measurement made by the measurement unit.

According to this configuration, a three-dimensional shaped article production apparatus capable of efficiently producing a three-dimensional shaped article having high dimensional accuracy can be provided.

In the three-dimensional shaped article production apparatus according to the aspect of the invention, it is preferred that the apparatus further includes a bonding unit which applies energy for bonding the particles to a stacked body obtained by stacking the layers.

According to this configuration, a three-dimensional shaped article can be produced in the same apparatus without taking the stacked body obtained by stacking a plurality of layers outside the three-dimensional shaped article production apparatus, and therefore, the productivity of the three-dimensional shaped article can be further increased.

A three-dimensional shaped article according to an aspect of the invention is produced using the three-dimensional shaped article production apparatus according to the aspect of the invention.

According to this configuration, a three-dimensional shaped article having high dimensional accuracy can be provided.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, preferred embodiments will be described in detail with reference to the accompanying drawings.

Three-Dimensional Shaped Article Production Method

First, a three-dimensional shaped article production method according to the invention will be described.

Figure 1:
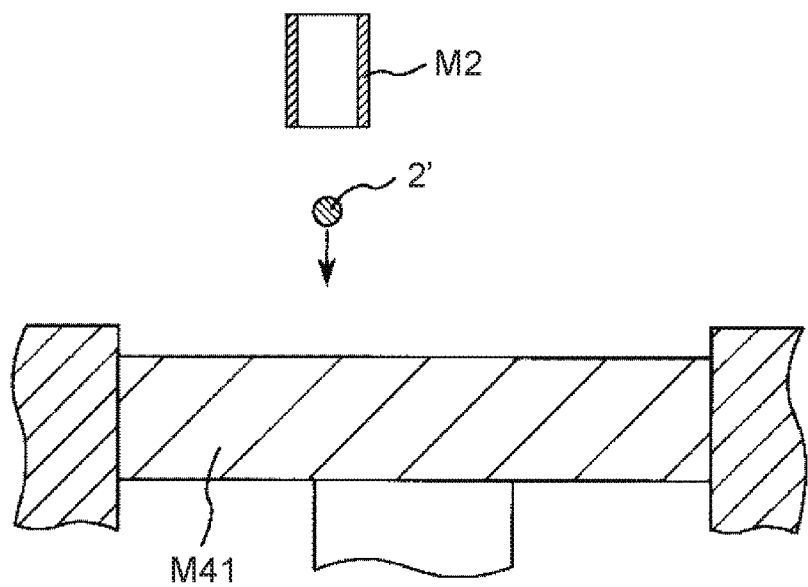
FIG. 1 is a vertical cross-sectional view schematically showing a step (layer formation step) of a preferred embodiment of a three-dimensional shaped article production method according to the invention.
Figure 2:
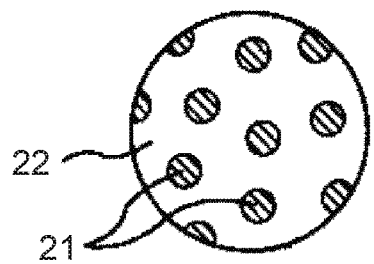
FIG. 2 is an enlarged view showing a state of a composition (actual body part forming composition) to be ejected.
Figure 3:
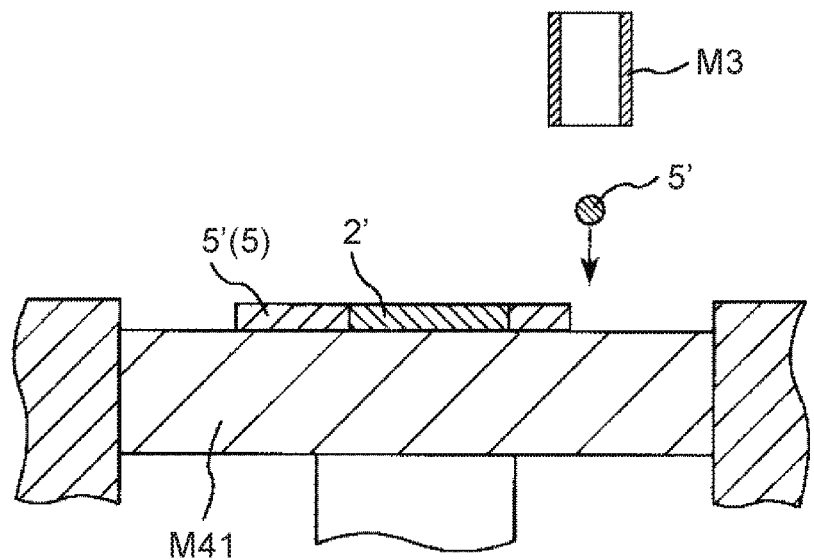
FIG. 3 is a vertical cross-sectional view schematically showing a step (layer formation step) of a preferred embodiment of a three-dimensional shaped article production method according to the invention.
Figure 4:
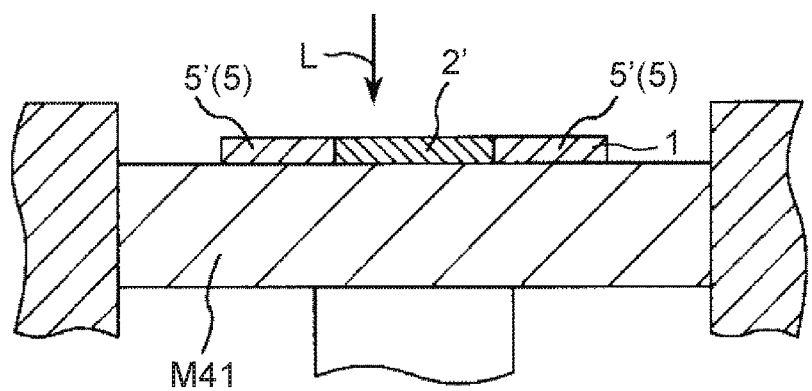
FIG. 4 is a vertical cross-sectional view schematically showing a step (measurement step) of a preferred embodiment of a three-dimensional shaped article production method according to the invention.
Figure 5:
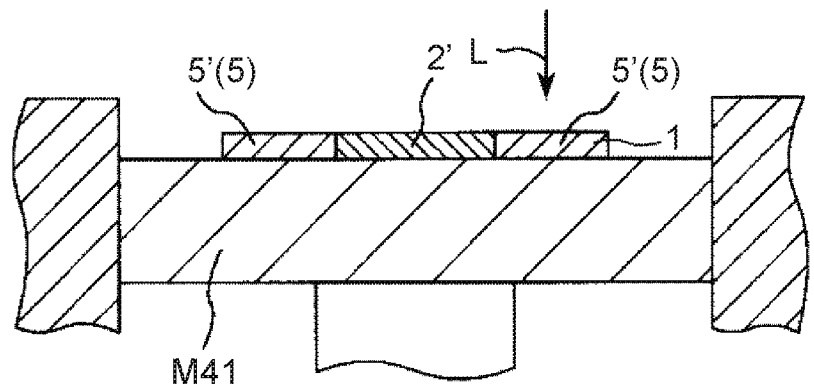
FIG. 5 is a vertical cross-sectional view schematically showing a step (measurement step) of a preferred embodiment of a three-dimensional shaped article production method according to the invention.
Figure 6:
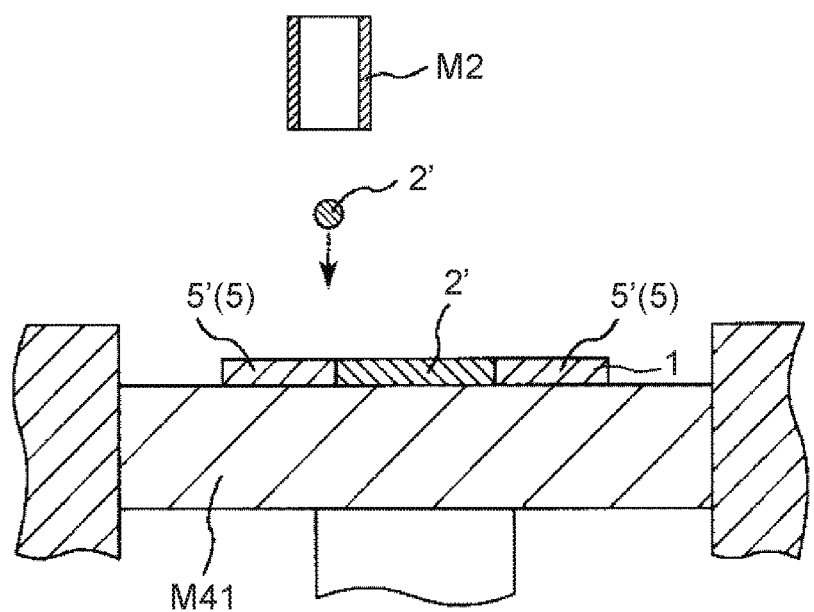
FIG. 6 is a vertical cross-sectional view schematically showing a step (layer formation step) of a preferred embodiment of a three-dimensional shaped article production method according to the invention.
Figure 7:
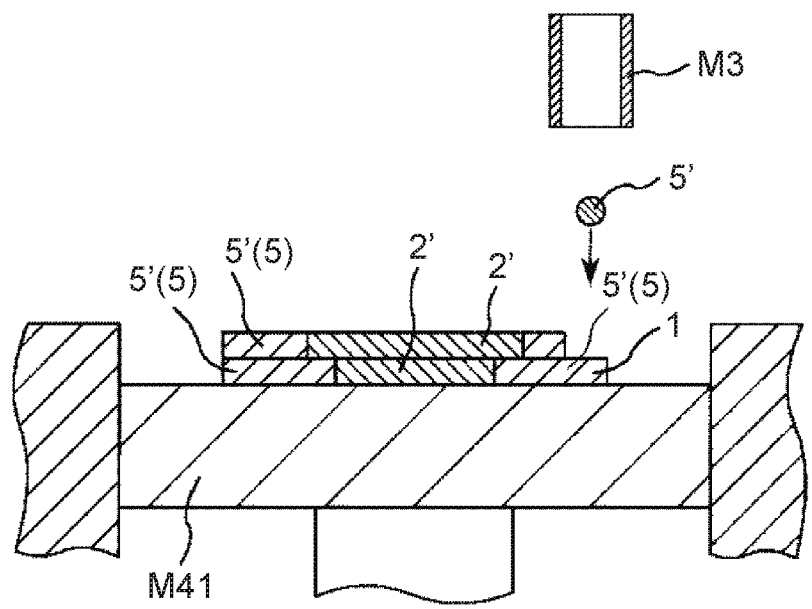
FIG. 7 is a vertical cross-sectional view schematically showing a step (layer formation step) of a preferred embodiment of a three-dimensional shaped article production method according to the invention.
Figure 8:
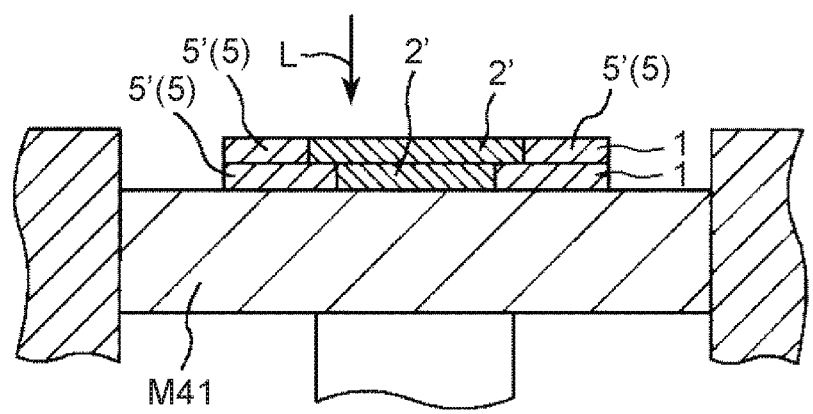
FIG. 8 is a vertical cross-sectional view schematically showing a step (measurement step) of a preferred embodiment of a three-dimensional shaped article production method according to the invention.
Figure 9:
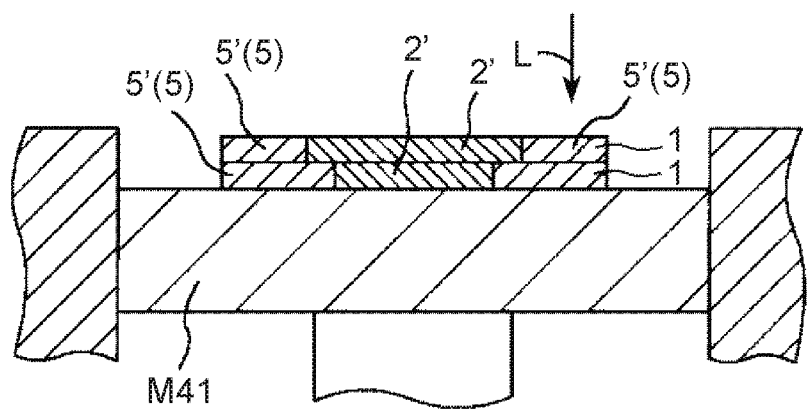
FIG. 9 is a vertical cross-sectional view schematically showing a step (measurement step) of a preferred embodiment of a three-dimensional shaped article production method according to the invention.
Figure 10:
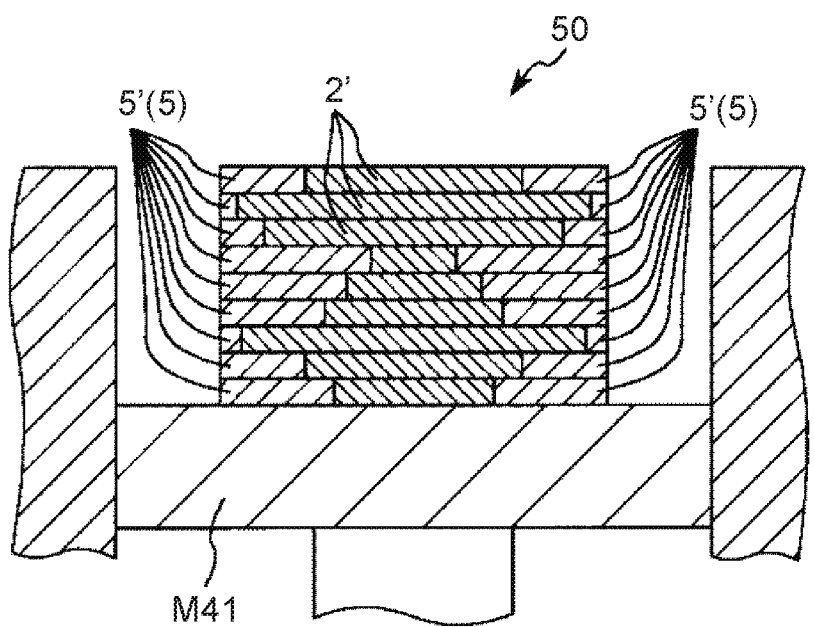
FIG. 10 is a vertical cross-sectional view schematically showing a step of a preferred embodiment of a three-dimensional shaped article production method according to the invention.
Figure 11:
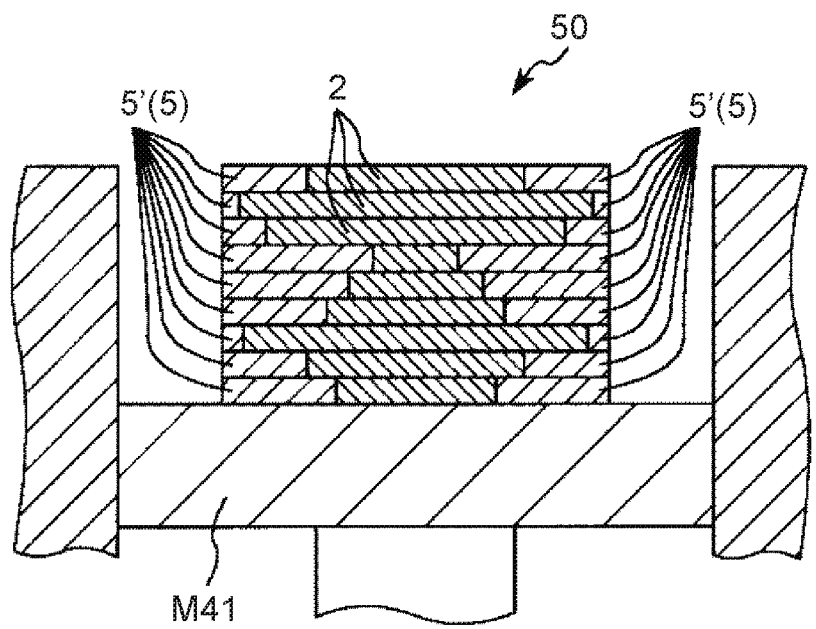
FIG. 11 is a vertical cross-sectional view schematically showing a step (bonding step) of a preferred embodiment of a three-dimensional shaped article production method according to the invention.
Figure 12:
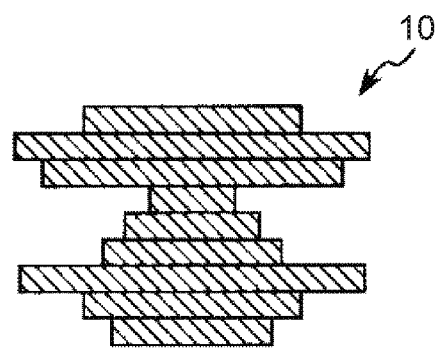
FIG. 12 is a vertical cross-sectional view schematically showing a step (support material removal step) of a preferred embodiment of a three-dimensional shaped article production method according to the invention.
Figure 13:
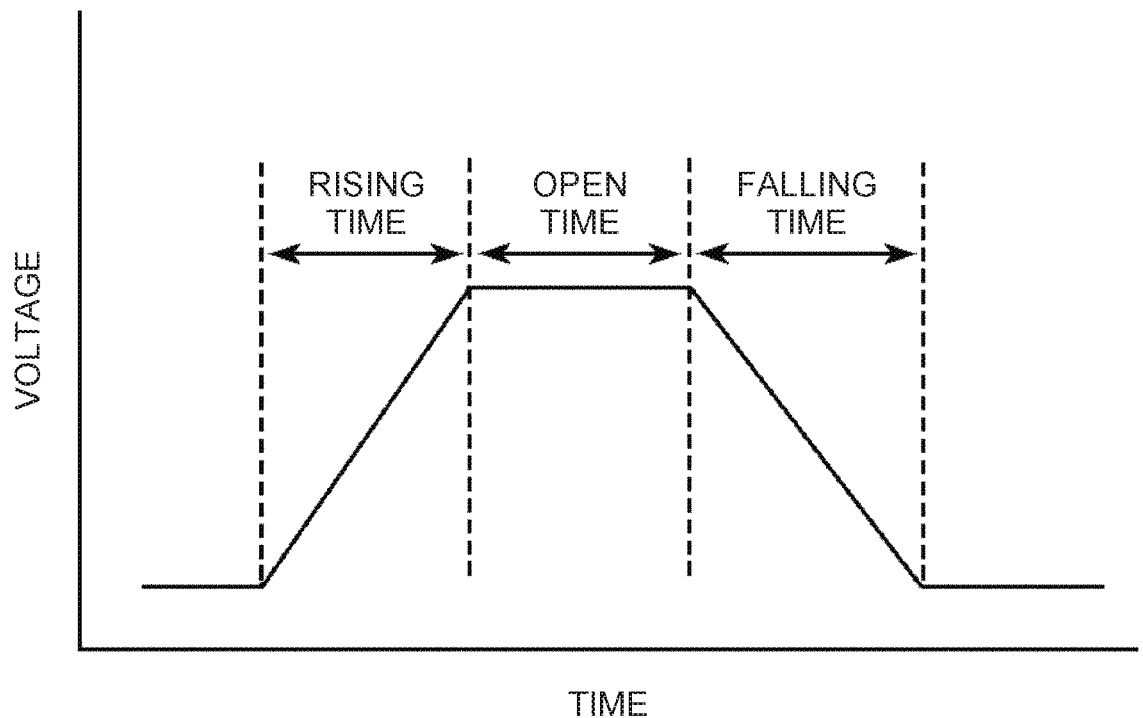
FIG. 13 is a view schematically showing one example of a driving waveform for a dispenser.
Figure 14:
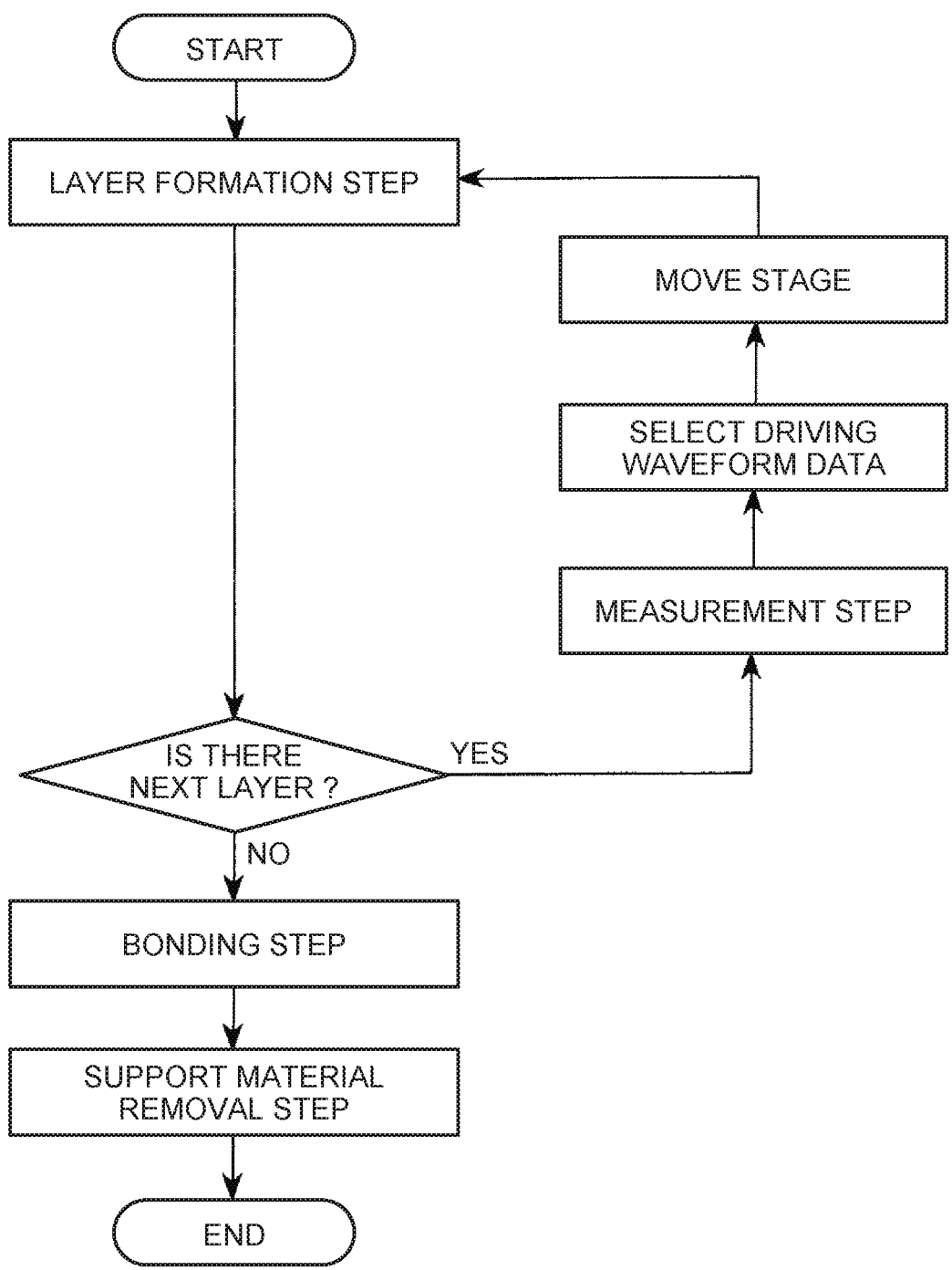
FIG. 14 is a flowchart showing one example of a three-dimensional shaped article production method according to the invention.

FIGS. 1 and 3 to 12 are each a vertical cross-sectional view schematically showing a step of a preferred embodiment of a three-dimensional shaped article production method according to the invention. FIG. 2 is an enlarged view showing a state of a composition (actual body part forming composition) to be ejected. FIG. 13 is a view schematically showing one example of a driving waveform for a dispenser. FIG. 14 is a flowchart showing one example of a three-dimensional shaped article production method according to the invention.

As shown in the drawings, the three-dimensional shaped article production method according to this embodiment is a method for producing a three-dimensional shaped article 10 by stacking a plurality of layers 1, and includes a layer formation step of forming each layer 1 by ejecting a composition 2' and a composition 5' as compositions containing particles and a solvent in a predetermined pattern using dispensers M2 and M3, a measurement step of determining the height of the layer 1, and a bonding step of subjecting a stacked body 50 including a plurality of layers 1 to a bonding treatment for bonding the particles (particularly, the particles 21 constituting the composition 2').

When n represents an arbitrary integer of 1 or more, by selecting driving waveform data for the dispenser (dispenser M2 or dispenser M3) when ejecting the composition (composition 2' or composition 5') from a data group including a plurality of pieces of driving waveform data based on the information of the height of the layer 1 in the n-th position (hereinafter referred to as "n-th layer") determined in the measurement step, the ejection amount of the composition per unit area onto the n-th layer in the layer formation step of forming the layer 1 in the (n+1)th position (hereinafter referred to as "(n+1)th layer") is adjusted.

In this manner, by ejecting the composition using the dispenser, even a composition having a high viscosity can be favorably ejected, and the composition can be effectively prevented from dripping or the like after the composition comes into contact with a target portion. As a result, the dimensional accuracy of the finally obtained three-dimensional shaped article 10 can be enhanced. Further, by using a composition having a high viscosity, the layer 1 having a relatively large thickness can be easily formed, and thus, the productivity of the three-dimensional shaped article 10 can be increased.

Further, by adjusting the thickness of the layer 1 by adjusting the ejection amount of the composition, the dimensional accuracy of the finally obtained three-dimensional shaped article 10 can be enhanced. In particular, by adjusting the ejection amount of the composition by selecting driving waveform data for the dispenser when ejecting the composition from a data group including a plurality of pieces of driving waveform data, even if it is necessary to change the ejection amount of the composition, the composition can be ejected at a high frequency, and thus, the productivity of the three-dimensional shaped article 10 can be increased.

Further, by adjusting the thickness with the (n+1)th layer while allowing the deviation of the thickness in the n-th layer, the productivity of the three-dimensional shaped article 10 can be particularly increased.

That is, in the case where a deviation of the thickness occurs (in other words, in the case where the thickness of the layer is smaller than a desired value) in each layer constituting the three-dimensional shaped article, it is considered that the composition is additionally supplied when forming the layer so that the thickness of the layer becomes a predetermined value, however, in such a method, the productivity of the three-dimensional shaped article is remarkably decreased. Further, such a method can be applied to a case where the thickness of the layer is smaller than a desired value, but cannot be applied to a case where the thickness of the layer is larger than a desired value.

On the other hand, as in this embodiment, by adjusting the thickness with the (n+1)th layer while allowing the deviation of the thickness in the n-th layer (in other words, by adjusting the ejection amount of the composition per unit area onto the n-th layer (hereinafter also simply referred to as "the supply amount of the composition")), the dimensional accuracy of the three-dimensional shaped article 10 can be sufficiently enhanced, and also the productivity of the three-dimensional shaped article 10 can be increased. Further, the method according to this embodiment can be applied not only to the case where the thickness of the n-th layer is smaller than a desired value, but also to the case where it is larger than a desired value.

Incidentally, in the invention, it is only necessary to perform the measurement and the adjustment of the ejection amount of the composition as described above when at least one set of adjacent two layers are formed among the layers constituting the stacked body to be formed in the production of the three-dimensional shaped article, and it is not necessary to perform the measurement and the adjustment of the ejection amount of the composition as described above for all combinations of adjacent two layers constituting the stacked body. However, it is preferred to perform the measurement and the adjustment of the ejection amount of the composition as described above for at least a plurality of combinations (in other words, a plurality of n), and it is more preferred to perform the measurement and the adjustment of the ejection amount of the composition as described above for combinations of all layers (in other words, in the case where the stacked body is obtained by stacking m (m is a positive integer) layers, (m−1) combinations of layers).

According to this, the effect as described above is more remarkably exhibited.

In this embodiment, the height of the layer 1 in the case where n is an integer of 2 or more (the height of the n-th layer) refers to a height corresponding to a thickness obtained by accumulating the thicknesses of the respective layers from the first layer to the n-th layer, and does not refer to the thickness of the n-th layer alone.

Hereinafter, the respective steps will be described in detail.

Layer Formation Step

In the layer formation step, a composition (actual body part forming composition) 2' in the form of a liquid containing a plurality of particles 21 and a dispersion medium 22 for dispersing the particles (dispersoids) 21 is ejected onto a predetermined portion (that is, a portion corresponding to a portion to become an actual body part of a three-dimensional shaped article 10), whereby a layer 1 is formed.

In particular, in the layer formation step of forming the layer 1 of the first layer, the composition 2' is ejected onto the surface of a stage (support) M41, and in the layer formation step of forming the layer 1 of the second layer or thereafter, the composition 2' is ejected onto the previously formed layer 1. That is, in the layer formation step of forming the layer 1 of the first layer, the stage M41 serves as an adherend of the composition 2', and in the layer formation step of forming the layer 1 of the second layer or thereafter, the previously formed layer 1 serves as an adherend of the composition 2'. Incidentally, a metal plate (not shown) is placed on the stage M41, and the metal plate may be used as an adherend.

Further, in this embodiment, the layer 1 is formed by ejecting the composition 2' which contributes to the formation of the actual body part of the three-dimensional shaped article 10 by the dispenser M2, and also ejecting a support material forming composition (composition) 5' to be used for forming a support material (support part) 5 having a function to support a portion to become the actual body part of the three-dimensional shaped article 10 in the process for producing the three-dimensional shaped article 10 by the dispenser M3.

According to this, in the case where a plurality of layers 1 are stacked, even when at least part of the portion corresponding to the actual body part of the three-dimensional shaped article 10 of the layer 1 to be newly formed does not come into contact with the portion corresponding to the actual body part of the three-dimensional shaped article 10 in the previously formed layer 1, the portion of the layer 1 to be newly formed (that is, the portion which does not come into contact with the portion corresponding to the actual body part of the three-dimensional shaped article 10 in the previously formed layer 1) can be favorably supported. In view of this, the three-dimensional shaped article 10 having various shapes can be produced with high dimensional accuracy.

The composition 2' and the support material forming composition 5' may be any as long as they have fluidity to such an extent that they can be ejected, and may be, for example, in the form of a paste.

The viscosity of the composition 2' and the support material forming composition 5' in this step is preferably 10 mPa·s or more and 20000 mPa·s or less, more preferably 100 mPa·s or more and 10000 mPa·s or less.

According to this, the ejection stability of the composition 2' and the support material forming composition 5' can be further increased, and also the compositions are suitable for forming the layer 1 having a moderate thickness, and can further increase the productivity of the three-dimensional shaped article 10. Further, the excessive wet spreading of the composition 2' and the support material forming composition 5' coming into contact with the adherend is effectively prevented, and thus, the dimensional accuracy of the finally obtained three-dimensional shaped article 10 can be further enhanced.

Incidentally, unless otherwise specified, the "viscosity" as used herein refers to a value measured using a rheometer under the condition that the shear rate is $10 \text{ s}^{-1}$.

In this step, it is preferred that each of the composition 2' and the support material forming composition 5' is ejected in the form of a plurality of liquid droplets.

According to this, the composition can also be more favorably applied to the production of the three-dimensional shaped article 10 having, for example, a fine structure, and the dimensional accuracy of the three-dimensional shaped article 10 can be further enhanced.

In the case where the composition 2' or the support material forming composition 5' is ejected in the form of a plurality of liquid droplets in this step, the volume per droplet of the liquid droplet to be ejected is preferably 1 pL or more and 500 pL or less, more preferably 2 pL or more and 300 pL or less.

According to this, the composition can also be more favorably applied to the production of the three-dimensional shaped article 10 having, for example, a fine structure, and the dimensional accuracy of the three-dimensional shaped article 10 can be further enhanced, and also the productivity of the three-dimensional shaped article 10 can be further increased.

In the production of the three-dimensional shaped article 10, a plurality of types of compositions 2' may be used.

According to this, for example, materials can be combined according to the properties required for the respective portions of the three-dimensional shaped article 10, and therefore, the properties (including appearance, functionality (such as elasticity, toughness, heat resistance, and corrosion resistance), etc.) of the three-dimensional shaped article 10 as a whole can be further enhanced.

Further, in the production of the three-dimensional shaped article 10, a plurality of types of support material forming compositions 5' may be used.

The actual body part forming composition 2' and the support material forming composition 5' will be described in detail later.

In the production of the three-dimensional shaped article 10, the layer formation step is performed only a predetermined number of times, and the stacked body 50 in which a plurality of layers 1 are stacked is obtained.

That is, it is determined whether or not a new layer 1 should be formed on the previously formed layer 1, and in the case where there is a layer 1 which should be formed, a new layer 1 is formed, and in the case where there is no layer 1 which should be formed, a bonding step which will be described in detail later is performed for the stacked body 50.

In the layer formation step of forming the layer 1 of the second layer or thereafter, by selecting driving waveform data for the dispenser M2 or M3 when ejecting the composition 2' or the composition 5' from a data group including a plurality of pieces of driving waveform data based on the information of the height of the previously formed layer 1 determined in the measurement step which will be described in detail later, the ejection amount of the composition per unit area is adjusted. That is, when n represents an arbitrary integer of 1 or more, by selecting driving waveform data for the dispenser M2 or M3 when ejecting the composition 2' or the composition 5' from a data group including a plurality of pieces of driving waveform data based on the information of the height of the layer in the n-th position (n-th layer) determined in the measurement step, the ejection amount of the composition per unit area onto the n-th layer in the layer formation step of forming the layer in the (n+1)th position ((n+1)th layer) is adjusted.

As shown in the drawing, the driving waveform for the dispenser generally includes a rising part in which a pulsed DC voltage rises, an open part in which the voltage becomes constant, and a falling part in which the voltage falls. By adjusting times in these parts (a rising time, an open time, and a falling time) or the maximum voltage, or the like, the driving waveform for the dispenser can be adjusted.

The data group can include a plurality of pieces of data (driving waveform data) in which at least one of these conditions is mutually different.

Further, it is preferred that the data group includes reference driving waveform data for a predetermined ejection amount, driving waveform data for a decreased amount such that the ejection amount is smaller than that in the case of using the reference driving waveform data, and driving waveform data for an increased amount such that the ejection amount is larger than that in the case of using the reference driving waveform data.

According to this, for example, in the layer formation step of forming the n-th layer, the reference driving waveform data is used, and in the layer formation step of forming the (n+1)th layer, the ejection amount of the composition 2' or the composition 5' per unit area can be adjusted using at least one of the driving waveform data for a decreased amount and the driving waveform data for an increased amount, and therefore, the ejection amount of the composition 2' or the composition 5' (in other words, the thickness of the (n+1)th layer) in the layer formation step of forming the (n+1)th layer can be favorably adjusted in both cases where the height of the n-th layer is smaller than a desired value and where the height of the n-th layer is larger than a desired value. More specifically, in the case where the height of the n-th layer is lower than a target value, the driving waveform data for an increased amount is used, and in the case where the height of the n-th layer is higher than a target value, the driving waveform data for a decreased amount is used. By doing this, the height after forming the (n+1)th layer can be favorably adjusted. As a result, the dimensional accuracy of the three-dimensional shaped article 10 can be further enhanced.

The thickness of the layer 1 to be formed using the reference driving waveform data is not particularly limited, but is preferably 10 μm or more and 500 μm or less, more preferably 20 μm or more and 250 μm or less.

According to this, the dimensional accuracy of the three-dimensional shaped article 10 can be further enhanced while increasing the productivity of the three-dimensional shaped article 10.

The ejection amount of the composition per unit area when using the driving waveform data for a decreased amount is not particularly limited, but is preferably 10% or more and 90% or less, more preferably 20% or more and 80% or less with respect to the ejection amount of the composition per unit area when using the reference driving waveform data.

According to this, both productivity and dimensional accuracy of the three-dimensional shaped article 10 can be achieved at a higher level.

The ejection amount of the composition per unit area when using the driving waveform data for an increased amount is not particularly limited, but is preferably 110% or more and 190% or less, more preferably 120% or more and 180% or less with respect to the ejection amount of the composition per unit area when using the reference driving waveform data.

According to this, both productivity and dimensional accuracy of the three-dimensional shaped article 10 can be achieved at a higher level.

The data group may include a plurality of pieces of driving waveform data with respect to, for example at least one of the driving waveform data for a decreased amount and the driving waveform data for an increased amount. For example, the data group may include a plurality of pieces of driving waveform data for a decreased amount, or may include a plurality of pieces of driving waveform data for an increased amount, or may include a plurality of pieces of driving waveform data for a decreased amount and a plurality of pieces of driving waveform data for an increased amount.

According to this, the dimensional accuracy of the three-dimensional shaped article 10 can be further enhanced.

Further, in the formation of one layer 1, a plurality of pieces of driving waveform data (for example, at least one piece of driving waveform data for a decreased amount and at least one piece of driving waveform data for an increased amount) may be used.

According to this, the height of the layer 1 in the respective portions can be more favorably adjusted, and thus, the dimensional accuracy of the three-dimensional shaped article 10 can be further enhanced.

Measurement Step

After the layer formation step, the height of the layer 1 formed in the layer formation step is determined.

The information of the height of the layer 1 (n-th layer) measured in this step is utilized for the adjustment of the ejection amount of the composition 2' or the composition 5' per unit area when the layer 1 ((n+1)th layer) is newly formed on the surface of the layer 1.

The measurement of the height of the layer 1 may be performed by any method, but can be performed using, for example, a laser displacement meter.

According to this, the height of the layer 1 can be determined with high accuracy using a relatively inexpensive device. Incidentally, the arrows in FIGS. 4, 5, 8, and 9 indicate light (laser light) L for measurement.

In the measurement step, it is only necessary to determine the height in at least one place of the portion where the (n+1)th layer is to be stacked in the surface of the n-th layer, however, it is preferred that the height is determined in a plurality of places where the (n+1)th layer is to be stacked and the ejection amount of the composition per unit area in the layer formation step of forming the (n+1)th layer is adjusted so that the film thickness becomes a desired value with the n-th layer and the (n+1)th layer.

According to this, the height of the layer 1 in the respective portions can be individually adjusted, and thus, the dimensional accuracy of the three-dimensional shaped article 10 can be further enhanced.

In the case where the height is determined in a plurality of places in the surface of the n-th layer in this manner, in the n-th layer, the measurement may be performed in a plurality of places where the composition 2' is applied, or the measurement may be performed in a plurality of places where the composition 5' is applied, or the measurement may be performed in a place where the composition 5' is applied in addition to a place where the composition 2' is applied.

Further, in the case where the height is determined in a plurality of places in the surface of the n-th layer, the measurement may be performed in a plurality of places where the composition 2' is to be applied when forming the (n+1)th layer, or the measurement may be performed in a plurality of places where the composition 5' is to be applied when forming the (n+1)th layer, or the measurement may be performed in a place where the composition 5' is to be applied in addition to a place where the composition 2' is to be applied when forming the (n+1)th layer.

The number of places where the height of the n-th layer is measured varies depending on the area of the n-th layer (the area of a region where the (n+1)th layer is to be stacked in the n-th layer) or the like, but is preferably 2 places or more and 1000 places or less, more preferably 3 places or more and 500 places or less.

According to this, both productivity and dimensional accuracy of the three-dimensional shaped article 10 can be achieved at a higher level.

Further, the number of measurement places per unit area of the n-th layer (the number of measurement places per unit area of the region where the (n+1)th layer is to be stacked in the n-th layer) is preferably 0.01 places/cm$^2$ or more and 3.0 places/cm$^2$ or less, more preferably 0.05 places/cm$^2$ or more and 1.0 places/cm$^2$ or less.

According to this, both productivity and dimensional accuracy of the three-dimensional shaped article 10 can be achieved at a higher level.

As described above, the compositions 2' and 5' to be ejected from the dispensers M2 and M3 contain a solvent.

The removal of the solvent from the composition 2' or the composition 5' ejected from the dispenser M2 or M3 may be performed at any timing, but is preferably performed before performing the measurement step for the layer 1 formed using the composition. In other words, it is preferred to perform the measurement step for the n-th layer after performing a solvent removal step of removing the solvent from the n-th layer.

According to this, the effect of the deformation (change in the thickness) of the n-th layer after performing the measurement step can be prevented, and the application amount of the composition 2' or the composition 5' in the layer formation step of forming the (n+1)th layer can be more appropriately determined. As a result, the dimensional accuracy of the three-dimensional shaped article 10 can be further enhanced.

The removal of the solvent from the ejected composition 2' or the composition 5' can be performed by, for example, a heating treatment or a depressurization treatment.

The solvent removal step may be performed before the composition 2' or the composition 5' comes into contact with a target portion, or may be performed after the composition 2' or the composition 5' comes into contact with a target portion.

It is determined whether or not a new layer should be formed on the upper surface of the layer 1, and in the case where there is a next layer which should be formed, the stage is moved, and a series of steps as described above (that is, a series of steps including the layer formation step and the measurement step) are performed.

Bonding Step

After a stacked body 50 in which a predetermined number of layers 1 are stacked is obtained by repeatedly performing the above-mentioned steps (see FIG. 10), the stacked body 50 is subjected to a bonding treatment for bonding the particles 21 contained in the composition 2'. In other words, in the case where there is no next layer which should be formed after repeatedly performing a series of steps as described above, the obtained stacked body 50 is subjected to a bonding treatment for bonding the particles 21 contained in the composition 2'.

According to this, the particles 21 contained in the composition 2' are bonded to each other, whereby a bonded part 2 is formed. By forming the bonded part 2 in this manner, the actual body part (bonded part 2) of the three-dimensional shaped article 10 is configured such that the particles 21 are firmly bonded to each other, and therefore, undesirable deformation or the like of the three-dimensional shaped article 10 in a support material removal step as a post-treatment to be performed thereafter is effectively prevented, and the dimensional accuracy, mechanical strength, and the like of the finally obtained three-dimensional shaped article 10 can be enhanced.

The bonding step may be performed by any method as long as the method is performed for the stacked body 50 including a plurality of layers 1, but is generally performed by a heating treatment.

The heating in the bonding step (sintering step) is preferably performed at a temperature higher than the melting point of the constituent material of the particles 21 (in the case where the particles 21 contain a plurality of components, the melting point of a component whose content is the highest).

According to this, the bonding of the particles 21 can be more efficiently performed.

When the melting point of the constituent material of the particles 21 is represented by Tm (° C.), the heating temperature in the bonding step is preferably (Tm+1)° C. or higher and (Tm+80)° C. or lower, more preferably (Tm+5)° C. or higher and (Tm+60)° C. or lower.

According to this, the bonding of the particles 21 can be more efficiently performed by a heating treatment in a shorter time, and also undesirable deformation of the stacked body 50 during the bonding step can be more effectively prevented, and thus, the dimensional accuracy of the three-dimensional shaped article 10 can be further enhanced.

In the case where the particles 21 contain a plurality of components, the melting point of a component whose content is the highest can be adopted as the melting point.

The heating time in the bonding step is not particularly limited, but is preferably 30 seconds or more and 60 minutes or less, more preferably 1 minute or more and 30 minutes or less.

According to this, undesirable deformation in this step can be more effectively prevented while allowing the bonding of the particles 21 to proceed sufficiently, and thus, both mechanical strength and dimensional accuracy of the three-dimensional shaped article 10 can be achieved at a higher level, and also the productivity of the three-dimensional shaped article 10 can be further increased.

Further, in the case where the support material forming composition 5' contains particles, the bonding of the particles may be performed in this step.

In the case where the bonding of the particles constituting the support material forming composition 5' is performed in this step, the bonding of the particles may be performed such that the bonding strength (for example, the sintering degree) between the particles is smaller than the bonding strength (for example, the sintering degree) between the particles 21 constituting the composition 2'.

According to this, while effectively exhibiting the function as the support material 5, the removal of the support material 5 in the below-mentioned support material removal step can be more easily performed.

Support Material (Support Part) Removal Step

After performing the bonding step, the support material 5 is removed as a post-treatment step. By doing this, the three-dimensional shaped article 10 is taken out.

Examples of a specific method of this step include a method in which the support material 5 is removed by brushing with a brush or the like, a method in which the support material 5 is removed by suction, a method in which a gas such as air is blown thereto, a method in which a liquid such as water is applied thereto (for example, a method in which a complex of the support material 5 and the three-dimensional shaped article 10 obtained as described above is soaked in a liquid, a method in which a liquid is sprayed thereto, etc.), a method in which vibration such as ultrasonic vibration is applied thereto, and a method in which the support material 5 formed by bonding the particles is destroyed by smashing or the like. Further, two or more methods selected from these methods can be performed in combination.

In addition, for example, a method in which the support material 5 is removed by using a liquid capable of dissolving at least a portion of the support material 5, or a method in which the support material 5 is removed by decomposition through a chemical reaction may be adopted.

According to the production method according to the invention as described above, a three-dimensional shaped article having high dimensional accuracy can be efficiently produced.

The three-dimensional shaped article production method as described above is summarized in a flowchart as shown in FIG. 14.

Incidentally, in the configuration shown in the drawings, a case where the above-mentioned respective steps are performed sequentially is described for facilitating the understanding, however, different steps may be performed simultaneously in the respective portions in a shaping region (that is, a space on the stage). For example, in different regions in a shaping region, the layer formation step and the measurement step may be performed simultaneously. Further, for example, indifferent regions in a shaping region, the layer formation step for the n-th layer and the layer formation step for the (n+1)th layer may be performed simultaneously, or the measurement step for the n-th layer and the measurement step for the (n+1)th layer may be performed simultaneously.

Three-Dimensional Shaped Article Production Apparatus

Next, the three-dimensional shaped article production apparatus according to the invention will be described.

Figure 15:
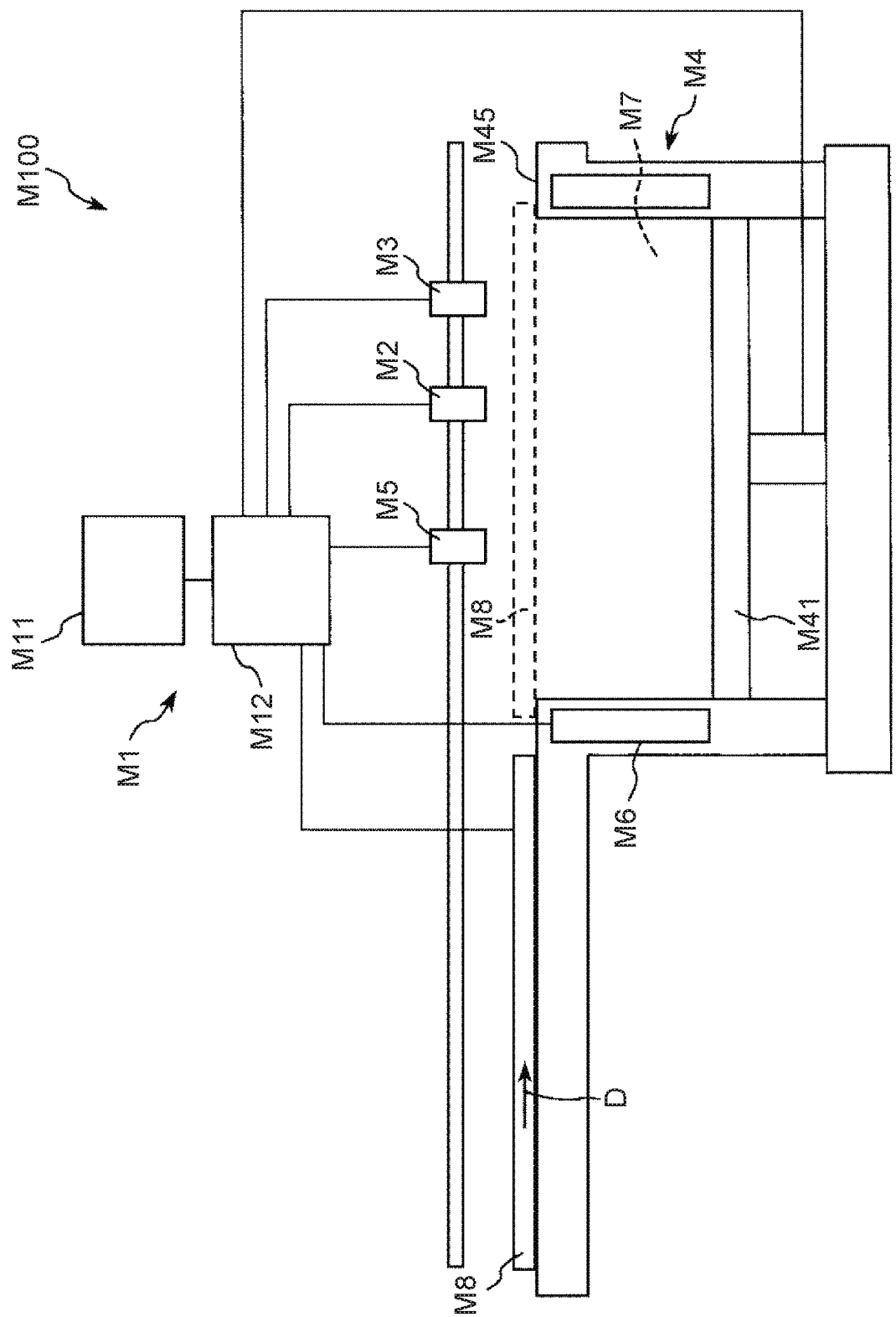
FIG. 15 is a cross-sectional view schematically showing a preferred embodiment of a three-dimensional shaped article production apparatus according to the invention.

FIG. 15 is a cross-sectional view schematically showing a preferred embodiment of the three-dimensional shaped article production apparatus according to the invention.

As shown in the drawing, a three-dimensional shaped article production apparatus M100 includes a control section M1, a dispenser M2 which ejects a composition 2' containing particles 21 and a solvent, a dispenser M3 which ejects a composition 5' containing particles and a solvent, a measurement unit M5 which determines the height of a layer 1 formed using the composition 2' or the composition 5', and a bonding unit M6 which applies energy to a stacked body 50 including a plurality of layers 1 so as to bond the particles 21 contained in the stacked body 50.

The control section M1 controls the ejection amount or the like of the composition 2' or 5' from the dispenser M2 or M3. More specifically, the control section M1 is configured to adjust the ejection amount of the composition 2' or 5' per unit area onto the layer 1 (n-th layer) whose height has been measured by selecting driving waveform data to be input to the dispenser M2 or M3 from a memory section including a plurality of pieces of driving waveform data based on the result of measurement made by the measurement unit M5 so as to adjust the height of the layer 1 ((n+1)th layer) to be formed on the layer 1 (n-th layer) whose height has been measured.

According to this, the production method for the three-dimensional shaped article 10 according to the invention as described above can be favorably performed, and the dimensional accuracy of the finally obtained three-dimensional shaped article 10 can be enhanced. In particular, by adjusting the ejection amount of the composition by selecting driving waveform data for the dispenser when ejecting the composition from a data group including a plurality of pieces of driving waveform data, even if it is necessary to change the ejection amount of the composition, the composition can be ejected at a high frequency, and thus, the productivity of the three-dimensional shaped article 10 can be increased.

Further, by performing the ejection of the composition using the dispenser, for example, as compared with the case where the composition is ejected by an inkjet method or the like, the productivity of the three-dimensional shaped article 10 can be particularly increased. In addition, even a composition having a relatively high viscosity can be favorably ejected, and therefore, the range of choice of the material is expanded.

Further, by adjusting the thickness with the (n+1)th layer while allowing the deviation of the thickness in the n-th layer, the productivity of the three-dimensional shaped article 10 can be increased.

The memory section may be a part of the control section M1 (more specifically, for example, a part of the below-mentioned computer M11) or may be one (an external memory unit) provided outside the control section M1.

The control section M1 includes a computer M11 and a drive control section M12.

The computer M11 is a common desktop computer or the like configured to include a CPU, a memory, etc. therein. The computer M11 digitizes the shape of a three-dimensional shaped article 10 as model data, and outputs cross-sectional data (slice data) obtained by slicing the three-dimensional shaped article 10 into a plurality of parallel layers of thin cross-sectional bodies to the drive control section M12.

Further, the computer M11 selects driving waveform data to be input to the dispenser M2 or M3 from the memory section including a plurality of pieces of driving waveform data based on the result of measurement made by the measurement unit M5 and outputs the selected data to the drive control section M12.

The drive control section M12 functions as a control unit which individually drives the dispenser M2, the dispenser M3, a layer forming section M4, the measurement unit M5, the bonding unit M6, a shutter M8, and the like. Specifically, the drive control section M12 controls, for example, the ejection pattern and the ejection amount of the composition 2' by the dispenser M2, the driving waveform for the dispenser M2, the ejection pattern and the ejection amount of the composition 5' by the dispenser M3, the driving waveform for the dispenser M3, the measurement of the height of the layer 1 by the measurement unit M5 (the setting of a measurement place, the detection of a height, etc.), the on/off of heating by the bonding unit (heating unit) M6, the heating temperature, the lowering amount of a stage (up-and-down stage) M41, the opening and closing of the shutter M8, and the like.

The layer forming section M4 includes the stage (up-and-down stage) M41, to which the composition 2' and the support material forming composition 5' are supplied, and which supports the layer 1 constituted by the composition 2' and the composition 5' (support material 5), and a frame body M45, which surrounds the up-and-down stage M41.

The up-and-down stage M41 is lowered sequentially by a predetermined amount according to the command from the drive control section M12 when a new layer 1 is formed on the previously formed layer 1.

The stage M41 has a flat surface (more specifically, a portion to which the composition 2' and the composition 5' are applied). According to this, the layer 1 having a highly uniform thickness can be easily and reliably formed.

The stage M41 is preferably constituted by a material having a high strength. Examples of the constituent material of the stage M41 include various metal materials such as stainless steel.

Further, the surface of the stage M41 may be subjected to a surface treatment. According to this, for example, the constituent material of the composition 2' or the constituent material of the composition 5' is more effectively prevented from being firmly adhered to the stage M41, or the durability of the stage M41 is made particularly excellent, and thus, the three-dimensional shaped article 10 can be stably produced for a longer period of time. Examples of the material to be used for the surface treatment for the surface of the stage M41 include fluororesins such as polytetrafluoroethylene.

The dispenser M2 is configured to move according to the command from the drive control section M12 and eject the composition 2' onto a desired portion on the stage M41 in a predetermined pattern.

The dispenser M2 is preferably configured to eject the composition 2' as a liquid droplet. According to this, the composition 2' can be applied in a fine pattern, and even if the three-dimensional shaped article 10 has a fine structure, the three-dimensional shaped article 10 can be produced with particularly high dimensional accuracy and particularly high productivity.

The dispenser M2 is configured such that the driving waveform, the pattern of the composition 2' to be applied (the pattern corresponding to the bonded part 2 to be formed), the amount of the composition 2', and the like are controlled according to the command from the drive control section M12. The driving waveform for the dispenser M2, the ejection pattern, the ejection amount, and the like of the composition 2' by the dispenser M2 are determined based on the slice data or the result of measurement made by the measurement unit M5. According to this, a necessary and sufficient amount of the composition 2' can be applied, and thus, the bonded part 2 in a desired pattern can be reliably formed, and the dimensional accuracy and the like of the three-dimensional shaped article 10 can be more reliably enhanced.

The dispenser M2 includes one ejection section (nozzle).

The size (nozzle diameter) of the ejection section of the dispenser M2 is not particularly limited, but is preferably 10 μm or more and 100 μm or less.

According to this, while further enhancing the dimensional accuracy of the three-dimensional shaped article 10, the productivity of the three-dimensional shaped article 10 can be further increased.

The dispenser M3 is configured to move according to the command from the drive control section M12 and eject the composition 5' onto a desired portion on the stage M41 in a predetermined pattern.

The dispenser M3 is preferably configured to eject the composition 5' as a liquid droplet. According to this, the composition 5' can be applied in a fine pattern, and even if the three-dimensional shaped article 10 has a fine structure, the three-dimensional shaped article 10 can be produced with particularly high dimensional accuracy and particularly high productivity.

The dispenser M3 is configured such that the driving waveform, the pattern of the composition 5' to be applied (the pattern corresponding to the support material 5 to be formed), the amount of the composition 5', and the like are controlled according to the command from the drive control section M12. The driving waveform for the dispenser M3, the ejection pattern, the ejection amount, and the like of the composition 5' by the dispenser M3 are determined based on the slice data or the result of measurement made by the measurement unit M5. According to this, a necessary and sufficient amount of the composition 5' can be applied, and thus, the support material in a desired pattern can be reliably formed, and the dimensional accuracy and the like of the three-dimensional shaped article 10 can be more reliably enhanced.

The dispenser M3 includes one ejection section (nozzle).

The size (nozzle diameter) of the ejection section of the dispenser M3 is not particularly limited, but is preferably 10 μm or more and 100 μm or less.

According to this, while further enhancing the dimensional accuracy of the three-dimensional shaped article 10, the productivity of the three-dimensional shaped article 10 can be further increased.

The measurement unit M5 determines the height of the layer 1 formed using the compositions 2' and 5'.

The data of measurement made by the measurement unit M5 is sent to the control section M1 and utilized for the adjustment of the ejection amount of the composition 2' or 5' per unit area in the layer formation step of forming the next layer ((n+1)th layer).

In this embodiment, the measurement unit M5 is a laser displacement meter.

The bonding unit M6 applies energy to the stacked body 50 including a plurality of layers 1 so as to bond the particles 21 contained in the stacked body 50 thereby forming the bonded part 2. That is, the three-dimensional shaped article production apparatus M100 according to this embodiment further includes the bonding unit M6 which applies energy for bonding the particles 21 to the stacked body 50 in which the layers 1 are stacked.

By including such a bonding unit M6, the three-dimensional shaped article 10 can be produced in the same apparatus without taking the stacked body 50 obtained by stacking a plurality of layers 1 outside the three-dimensional shaped article production apparatus M100, and therefore, the productivity of the three-dimensional shaped article 10 can be further increased.

In the configuration shown in the drawing, the shutter M8 is provided so that the stacked body 50 is placed in an isolation section M7, which is a space isolated from the dispensers M2 and M3, and the like (in other words, a space for isolating the stacked body 50 so as to prevent the dispensers M2 and M3, and the like from being adversely affected by heating by the bonding unit M6) when performing the bonding of the particles 21 in the stacked body 50.

According to this, the dispensers M2 and M3 can be effectively prevented from being adversely affected by heating (for example, clogging or the like due to the deposition of a solid component of the composition 2' or 5'), and thus, the three-dimensional shaped article 10 can be more stably produced over a long period of time.

Incidentally, the arrow in the drawing indicates the moving direction D of the shutter M8 when the stacked body 50 is isolated from the dispensers M2 and M3, and the like.

According to the three-dimensional shaped article production apparatus according to the invention as described above, a three-dimensional shaped article having high dimensional accuracy can be efficiently produced.

Composition (Actual Body Part Forming Composition)

Next, the composition (actual body part forming composition) 2' to be used for producing the three-dimensional shaped article 10 will be described.

The composition 2' contains at least a plurality of particles 21, and is a composition to be used for forming the actual body part of the three-dimensional shaped article 10.

Hereinafter, the constituent components of the composition 2' will be described.

Particles

The composition 2' contains a plurality of particles 21.

By including the particles 21 in the composition (actual body part forming composition) 2', the range of choice of the constituent material of the three-dimensional shaped article 10 can be expanded, and the three-dimensional shaped article 10 having desired physical properties, texture, etc. can be favorably obtained. For example, in the case where the three-dimensional shaped article is produced using a material dissolved in a solvent, there is a limitation on the material which can be used, however, by using the composition 2' containing the particles 21, such a limitation can be eliminated. Further, for example, the mechanical strength, toughness, durability, and the like of the three-dimensional shaped article 10 can be further enhanced, and it can be applied not only to trial production, but also to actual products.

Examples of the constituent material of the particles 21 include metal materials, metal compounds (such as ceramics), resin materials, and pigments.

The composition 2' preferably contains particles constituted by a material containing at least one of a metal material and a ceramic material as the particles 21.

According to this, for example, the texture (luxurious texture), mechanical strength, durability, and the like of the three-dimensional shaped article 10 can be further enhanced.

In particular, when the particles 21 are constituted by a material containing a metal material, the luxurious texture, massive look, mechanical strength, toughness, and the like of the three-dimensional shaped article 10 can be particularly enhanced. Further, heat dissipation after applying energy for bonding the particles 21 proceeds efficiently, and therefore, the productivity of the three-dimensional shaped article 10 can be particularly increased.

Examples of the metal material constituting the particles 21 include magnesium, iron, copper, cobalt, titanium, chromium, nickel, an alloy containing at least one metal selected from these (for example, a maraging steel, stainless steel, cobalt-chromium-molybdenum, a titanium alloy, a nickel-based alloy, an aluminum alloy, and the like).

Examples of the metal compound constituting the particles 21 include various metal oxides such as silica, alumina, titanium oxide, zinc oxide, zirconium oxide, tin oxide, magnesium oxide, and potassium titanate; various metal hydroxides such as magnesium hydroxide, aluminum hydroxide, and calcium hydroxide; various metal nitrides such as silicon nitride, titanium nitride, and aluminum nitride; various metal carbides such as silicon carbide and titanium carbide; various metal sulfides such as zinc sulfide; various metal carbonates such as calcium carbonate and magnesium carbonate; various metal sulfates such as calcium sulfate and magnesium sulfate; various metal silicates such as calcium silicate and magnesium silicate; various metal phosphates such as calcium phosphate; various metal borates such as aluminum borate and magnesium borate; and composites of these materials.

Examples of the resin material constituting the particles 21 include polybutylene terephthalate, polyethylene terephthalate, polypropylene, polystyrene, syndiotactic polystyrene, polyacetal, modified polyphenylene ether, polyether ether ketone, polycarbonate, acrylonitrile-butadiene-styrene copolymers (ABS resins), polyether nitrile, polyamide (such as nylon), polyarylate, polyamideimide, polyetherimide, polyimide, liquid crystalline polymers, polysulfone, polyethersulfone, polyphenylene sulfide, and fluororesins.

The shape of the particle 21 is not particularly limited, and may be any shape such as a spherical shape, a spindle shape, a needle shape, a cylindrical shape, or a scaly shape, further, the particle may have an irregular shape, but preferably has a spherical shape.

The average particle diameter of the particles 21 is not particularly limited, but is preferably 0.1 μm or more and 20 μm or less, more preferably 0.2 μm or more and 10 μm or less.

According to this, the fluidity of the composition 2' can be made more favorable, and therefore, the layer formation step can be more smoothly performed, and also the bonding of the particles 21 in the bonding step can be more favorably performed. In addition, for example, the removal or the like of the solvent, binder, or the like contained in the layer 1 can be efficiently performed, and thus, the constituent material other than the particles 21 can be more effectively prevented from undesirably remaining in the final three-dimensional shaped article 10. Due to this, while further increasing the productivity of the three-dimensional shaped article 10, the reliability and mechanical strength of the three-dimensional shaped article 10 to be produced can be further increased, and the occurrence of undesirable irregularities or the like in the three-dimensional shaped article 10 to be produced can be more effectively prevented, and the dimensional accuracy of the three-dimensional shaped article 10 can be further enhanced.

The "average particle diameter" as used herein refers to an average particle diameter on a volume basis and can be determined by, for example, adding a sample to methanol, followed by dispersion for 3 minutes using an ultrasonic disperser, and then, measuring the resulting dispersion liquid using a particle size distribution analyzer employing a Coulter counter method (for example, model TA-II, manufactured by Coulter Electronics, Inc.) with an aperture of 50 μm.

The Dmax of the particles 21 is preferably 0.2 μm or more and 25 μm or less, more preferably 0.4 μm or more and 15 μm or less.

According to this, the fluidity of the composition 2' can be made more favorable, and therefore, the layer formation step can be more smoothly performed, and also the bonding of the particles 21 in the bonding step can be more favorably performed. As a result, while further increasing the productivity of the three-dimensional shaped article 10, the mechanical strength of the three-dimensional shaped article 10 to be produced can be further increased, and the occurrence of undesirable irregularities or the like in the three-dimensional shaped article 10 to be produced can be more effectively prevented, and the dimensional accuracy of the three-dimensional shaped article 10 can be further increased.

The content of the particles 21 in the composition 2' is preferably 50 mass % or more and 99 mass % or less, more preferably 55 mass % or more and 70 mass % or less.

According to this, while further increasing the ease of handling of the composition 2', the amount of components to be removed in the process for producing the three-dimensional shaped article 10 can be further reduced, and therefore, it is particularly advantageous from the viewpoint of the productivity and production cost of the three-dimensional shaped article 10, the resource saving, and the like. In addition, the dimensional accuracy of the finally obtained three-dimensional shaped article 10 can be further increased.

The particles 21 are constituted by a material which undergoes a chemical reaction (for example, an oxidation reaction or the like) in the process for producing the three-dimensional shaped article 10 (for example, the bonding step or the like), and the formulation of the particles 21 contained in the composition 2' may be different from the formulation of the constituent material of the final three-dimensional shaped article 10.

The composition 2' may contain two or more types of particles.

Solvent

The composition 2' contains a solvent.

By including the solvent in the composition 2', the particles 21 can be favorably dispersed in the composition 2', and the ejection of the composition 2' by the dispenser M2 can be stably performed.

The solvent is not particularly limited as long as it has a function (a function as the dispersion medium) to favorably disperse the particles 21 in the composition 2', but is preferably a volatile solvent.

The volatile solvent can be efficiently removed in the process for producing the three-dimensional shaped article 10, and therefore, it is possible to effectively prevent the occurrence of a problem caused by the solvent undesirably remaining in the finally obtained three-dimensional shaped article 10.

Examples of the solvent include water; (poly)alkylene glycol monoalkyl ethers such as ethylene glycol monomethyl ether, ethylene glycol monoethyl ether, propylene glycol monomethyl ether, and propylene glycol monoethyl ether; acetate esters such as ethyl acetate, n-propyl acetate, iso-propyl acetate, n-butyl acetate, and iso-butyl acetate; aromatic hydrocarbons such as benzene, toluene, and xylene; ketones such as methyl ethyl ketone, acetone, methyl isobutyl ketone, ethyl n-butyl ketone, diisopropyl ketone, and acetyl acetone; alcohols such as ethanol, propanol, and butanol; tetra-alkyl ammonium acetates; sulfoxide-based solvents such as dimethyl sulfoxide and diethyl sulfoxide; pyridine-based solvents such as pyridine, picoline, and 2,6-lutidine; and ionic liquids such as tetra-alkyl ammonium acetate (for example, tetra-butyl ammonium acetate, etc.), and one type or two or more types in combination selected from these can be used.

In the case where the composition 2' contains the particles 21 constituted by a metal material, it is preferred to use an aprotic solvent as the solvent. According to this, an undesirable oxidation reaction or the like of the constituent material of the particles 21 can be effectively prevented.

The content of the solvent in the composition 2' is preferably 0.5 mass % or more and 70 mass % or less, more preferably 1 mass % or more and 50 mass % or less.

According to this, while further increasing the ease of handling of the composition 2', the amount of components to be removed in the process for producing the three-dimensional shaped article 10 can be further reduced, and therefore, it is particularly advantageous from the viewpoint of the productivity and production cost of the three-dimensional shaped article 10, the resource saving, and the like. In addition, the dimensional accuracy of the finally obtained three-dimensional shaped article 10 can be further increased.

Incidentally, as the solvent, for example, a non-volatile solvent which is solidified by a polymerization reaction like a polymerizable monomer or the like may be used.

Binder

The composition 2' may further contain a binder having a function to temporarily bond the particles 21 in the layer 1 in which the solvent has been removed in addition to the particles 21 and the solvent.

According to this, for example, undesirable deformation of the pattern formed using the composition 2' can be more effectively prevented. As a result, the dimensional accuracy of the three-dimensional shaped article 10 can be further enhanced. In addition, the void ratio (porosity) in the three-dimensional shaped article 10, the density of the three-dimensional shaped article 10, and the like can be favorably adjusted.

The binder may be any as long as it has a function to temporarily fix the particles 21 in the composition 2' (that is, the pattern formed using the composition 2') before being subjected to the bonding step, and for example, any of various resin materials and the like such as a thermoplastic resin and a curable resin can be used.

In the case where a curable resin is contained, a curing reaction of the curable resin may be performed at a timing after the composition 2' is ejected and before the bonding step is performed.

According to this, undesirable deformation of the pattern formed using the composition 2' can be more effectively prevented, and the dimensional accuracy of the three-dimensional shaped article 10 can be further enhanced.

A curing treatment of allowing the curing reaction of the curable resin to proceed can be performed by, for example, heating or irradiation with an energy ray such as a UV ray.

As the curable resin, for example, any of various thermosetting resins, photocurable resins, and the like can be favorably used.

As the curable resin (polymerizable compound), for example, any of various monomers, various oligomers (including dimers, trimers, and the like), prepolymers, and the like can be used, however, it is preferred that the composition 2' contains at least a monomer component as the curable resin (polymerizable compound). A monomer is generally a component having a lower viscosity than an oligomer component or the like, and therefore is advantageous for further increasing the ejection stability of the curable resin (polymerizable compound).

As the curable resin (polymerizable compound), a compound whose addition polymerization or ring-opening polymerization is initiated by a radical species, a cationic species, or the like generated from a polymerization initiator by irradiation with an energy ray, thereby forming a polymer is preferably used. Examples of the polymerization form of the addition polymerization include radical, cationic, anionic, metathesis, and coordination polymerization. Further, examples of the polymerization form of the ring-opening polymerization include cationic, anionic, radical, metathesis, and coordination polymerization.

The composition 2' may contain an oligomer (including a dimer, a trimer, or the like), a prepolymer, or the like other than the monomer as the curable resin (polymerizable compound).

In the composition 2', the binder may be contained in any form, but it is preferably in the form of a liquid (for example, in a molten state, a dissolved state, or the like). That is, the binder is preferably contained as a constituent component of the dispersion medium 22.

According to this, the binder can function as the dispersion medium 22 for dispersing the particles 21, and the ejection property of the composition 2' can be further enhanced. Further, the binder can favorably cover the particles 21 in the bonding step, so that the stability of the shape of the pattern (the pattern formed using the composition 2') when performing the bonding step can be further increased, and thus, the dimensional accuracy of the three-dimensional shaped article 10 can be further increased.

The content of the binder in the composition 2' is preferably 0.1 mass % or more and 48 mass % or less, more preferably 0.8 mass % or more and 10 mass % or less.

According to this, while making the fluidity of the composition 2' in the layer formation step more appropriate, the function to temporarily fix the particles 21 of the binder can be more effectively exhibited. In addition, the removal of the binder in the bonding step can be more reliably performed. As a result, while further increasing the productivity of the three-dimensional shaped article 10, the dimensional accuracy and reliability of the three-dimensional shaped article 10 to be produced can be further increased.

Other Component

The composition 2' may contain a component other than the above-mentioned components. Examples of such a component include a polymerization initiator, a dispersant, a surfactant, a thickener, an anti-aggregation agent, a defoaming agent, a slipping agent (leveling agent), a dye, a polymerization inhibitor, a polymerization accelerator, a permeation accelerator, a wetting agent (humectant), a fixing agent, an antifungal agent, a preservative, an antioxidant, a UV absorber, a chelating agent, and a pH adjusting agent.

Support Material Forming Composition

Next, the support material forming composition 5' to be used for producing the three-dimensional shaped article 10 will be described.

The support material forming composition 5' is a composition to be used for forming the support material 5.

Particles

The support material forming composition 5' preferably contains a plurality of particles.

By including the particles in the support material forming composition 5', even in the case where the support material 5 to be formed has a fine shape or the like, the support material 5 can be efficiently formed with high dimensional accuracy.

Examples of the constituent material of the particles constituting the support material forming composition 5' include metal materials, metal compounds (such as ceramics), resin materials, and pigments.

However, it is preferred that the particles constituting the support material forming composition 5' are constituted by a material having a higher melting point than that of the particles 21 constituting the composition 2'.

The shape of the particle is not particularly limited, and may be any shape such as a spherical shape, a spindle shape, a needle shape, a cylindrical shape, or a scaly shape, further, the particle may have an irregular shape, but preferably has a spherical shape.

The average particle diameter of the particles is not particularly limited, but is preferably 0.1 μm or more and 20 μm or less, more preferably 0.2 μm or more and 10 μm or less.

According to this, the fluidity of the support material forming composition 5' can be made more favorable, and therefore, the layer formation step can be more smoothly performed, and also the bonding of the particles in the bonding step can be more favorably performed. In addition, for example, the removal or the like of the solvent, binder, or the like contained in the layer 1 can be efficiently performed, and thus, the constituent material other than the particles can be more effectively prevented from undesirably remaining in the final three-dimensional shaped article 10. As a result, while further increasing the productivity of the three-dimensional shaped article 10, the occurrence of undesirable irregularities or the like in the three-dimensional shaped article 10 to be produced can be more effectively prevented, and the dimensional accuracy of the three-dimensional shaped article 10 can be further enhanced.

The Dmax of the particles is preferably 0.2 μm or more and 25 μm or less, more preferably 0.4 μm or more and 15 μm or less.

According to this, the fluidity of the support material forming composition 5' can be made more favorable, and therefore, the supply of the support material forming composition 5' can be more smoothly performed, and also the bonding of the particles in the bonding step can be more favorably performed. As a result, while further increasing the productivity of the three-dimensional shaped article 10, the occurrence of undesirable irregularities or the like in the three-dimensional shaped article 10 to be produced can be more effectively prevented, and the dimensional accuracy of the three-dimensional shaped article 10 can be further increased.

The content of the particles in the support material forming composition 5' is preferably 50 mass % or more and 99 mass % or less, more preferably 55 mass % or more and 98 mass % or less.

According to this, while further increasing the ease of handling of the support material forming composition 5', the amount of components to be removed in the process for producing the three-dimensional shaped article 10 can be further reduced, and therefore, it is particularly advantageous from the viewpoint of the productivity and production cost of the three-dimensional shaped article 10, the resource saving, and the like. In addition, the dimensional accuracy of the finally obtained three-dimensional shaped article 10 can be further increased.

The support material forming composition 5' may contain two or more types of particles.

Solvent

The support material forming composition 5' may contain a solvent.

By including the solvent in the support material forming composition 5', the particles can be favorably dispersed in the support material forming composition 5', and the ejection of the support material forming composition 5' by the dispenser M3 can be stably performed.

The solvent is not particularly limited as long as it has a function (a function as the dispersion medium) to favorably disperse the particles in the support material forming composition 5', but is preferably a volatile solvent.

The volatile solvent can be efficiently removed in the process for producing the three-dimensional shaped article 10, and therefore, it is possible to effectively prevent the occurrence of a problem caused by the solvent undesirably remaining in the finally obtained three-dimensional shaped article 10.

In the case where the support material forming composition 5' contains a solvent, as the solvent, for example, a solvent described as the constituent component of the composition 2' or the like can be used.

Incidentally, the solvent contained in the composition 2' and the solvent contained in the support material forming composition 5' may have the same conditions (for example, the same formulation or the like), or may have different conditions.

The content of the solvent in the support material forming composition 5' is preferably 0.5 mass % or more and 30 mass % or less, more preferably 1 mass % or more and 25 mass % or less.

According to this, while further increasing the ease of handling of the support material forming composition 5', the amount of components to be removed in the process for producing the three-dimensional shaped article 10 can be further reduced, and therefore, it is particularly advantageous from the viewpoint of the productivity and production cost of the three-dimensional shaped article 10, the resource saving, and the like. In addition, the dimensional accuracy of the finally obtained three-dimensional shaped article 10 can be further increased.

Binder

The support material forming composition 5' may further contain a binder having a function to temporarily bond the particles in the layer 1 in which the solvent has been removed in addition to the particles and the solvent.

According to this, for example, undesirable deformation of the support material 5 formed using the support material forming composition 5' can be more effectively prevented. As a result, the dimensional accuracy of the three-dimensional shaped article 10 can be further enhanced.

The binder may be any as long as it has a function to temporarily fix the particles in the support material forming composition 5' before being subjected to the bonding step, and for example, any of various resin materials and the like such as a thermoplastic resin and a curable resin can be used.

In the case where a curable resin is contained, a curing reaction of the curable resin may be performed at a timing after the support material forming composition 5' is ejected and before the bonding step is performed.

According to this, undesirable deformation of the pattern formed using the support material forming composition 5' (support material 5) can be more effectively prevented, and the dimensional accuracy of the three-dimensional shaped article 10 can be further enhanced.

A curing treatment can be performed by, for example, heating or irradiation with an energy ray such as a UV ray.

In the case where the support material forming composition 5' contains a curable resin, as the curable resin, for example, a curable resin described as the constituent component of the composition 2' or the like can be used.

Incidentally, the curable resin contained in the composition 2' and the curable resin contained in the support material forming composition 5' may have the same conditions (for example, the same formulation or the like), or may have different conditions.

The content of the binder in the support material forming composition 5' is preferably 0.5 mass % or more and 48 mass % or less, more preferably 1 mass % or more and 43 mass % or less.

According to this, while making the fluidity of the support material forming composition 5' in the layer formation step more appropriate, the function to temporarily fix the particles of the binder can be more effectively exhibited. In addition, the removal of the binder in the bonding step can be more reliably performed. As a result, while further increasing the productivity of the three-dimensional shaped article 10, the dimensional accuracy and reliability of the three-dimensional shaped article 10 to be produced can be further increased.

Other Component

The support material forming composition 5' may contain a component other than the above-mentioned components. Examples of such a component include a polymerization initiator, a dispersant, a surfactant, a thickener, an anti-aggregation agent, a defoaming agent, a slipping agent (leveling agent), a dye, a polymerization inhibitor, a polymerization accelerator, a permeation accelerator, a wetting agent (humectant), a fixing agent, an antifungal agent, a preservative, an antioxidant, a UV absorber, a chelating agent, and a pH adjusting agent.

Three-Dimensional Shaped Article

The three-dimensional shaped article according to the invention can be produced using the three-dimensional shaped article production apparatus according to the invention as described above.

According to this, a three-dimensional shaped article having high dimensional accuracy can be provided. Further, according to the production method and the production apparatus as described above, particles having various formulations can be used, and therefore, the range of choice of the constituent material of the three-dimensional shaped article can be expanded, and the three-dimensional shaped article having desired physical properties, texture, etc. can be favorably formed.

The use of the three-dimensional shaped article according to the invention is not particularly limited, however, examples of the use include ornaments and exhibits such as dolls and figures; and medical devices such as implants.

Further, the three-dimensional shaped article according to the invention may be applied to any of prototypes, mass-produced products, and custom-made products.

Hereinabove, preferred embodiments of the invention have been described, however, the invention is not limited thereto.

For example, in the three-dimensional shaped article production apparatus according to the invention, the configuration of each section can be replaced with an arbitrary configuration exhibiting a similar function, and also an arbitrary configuration can be added.

For example, the three-dimensional shaped article production apparatus according to the invention may include a depressurization unit (not shown). According to this, for example, the solvent can be efficiently removed from the ejected composition (the actual body part forming composition or the support material forming composition), and thus, the productivity of the three-dimensional shaped article can be particularly increased.

Further, the three-dimensional shaped article production apparatus according to the invention may include a heating unit for removing the solvent from the ejected composition (the actual body part forming composition or the support material forming composition). According to this, the productivity of the three-dimensional shaped article can be particularly increased.

Further, in the above-mentioned embodiments, a case where the layer is directly formed on the surface of the stage is representatively described, however, for example, a shaping plate is placed on the stage, and the three-dimensional shaped article may be produced by stacking the layers on the shaping plate.

Further, the three-dimensional shaped article production method according to the invention is not limited to the method performed by using the three-dimensional shaped article production apparatus as described above.

Further, in the above-mentioned embodiments, a case where a portion corresponding to the actual body part is formed in all the layers has been representatively described, however, a layer in which a portion corresponding to the actual body part is not formed may be included. For example, a layer in which a portion corresponding to the actual body part is not formed (for example, a layer constituted by only the support material) is formed on a contact surface with the stage (immediately above the stage), and the layer may be allowed to function as a sacrificial layer.

Further, in the above-mentioned embodiments, a case where the measurement step is performed after performing the layer formation step for all the layers except for the uppermost layer is representatively described, however, in the invention, the measurement step may be performed for only at least some of the layers constituting the stacked body. In addition, the measurement step may be performed also for the uppermost layer after performing the layer formation step.

Further, in the above-mentioned embodiments, a case where the height of the layer is determined in both of a portion formed using the actual body part forming composition (a portion to become the actual body part of the three-dimensional shaped article) and a portion formed using the support material forming composition in the n-th layer is mainly described. However, in the invention, it is only necessary to measure the height in at least one place in the n-th layer, and for example, a configuration in which the measurement is performed only in a portion formed using the actual body part forming composition and the measurement is not performed in a portion formed using the support material forming composition may be adopted. In addition, for example, a configuration in which the measurement is performed only in a portion formed using the support material forming composition and the measurement is not performed in a portion formed using the actual body part forming composition may be adopted.

Further, the above-mentioned embodiments are described under the assumption that the height of the layer 1 (the height of the n-th layer) in the case where n is an integer of 2 or more refers to a height corresponding to a thickness obtained by accumulating the thicknesses of the respective layers from the first layer to the n-th layer, however, as the height of the layer 1 (the height of the n-th layer) in the case where n is an integer of 2 or more, the thickness of the n-th layer alone may be used. For example, in the case where the layer 1 to be measured is viewed in a top view, the thickness can be measured based on a place where the surface of the layer 1 positioned beneath the layer 1 to be measured is exposed.

Further, in the three-dimensional shaped article production method according to the invention, the order of the steps or the treatments is not limited to the above-mentioned order, and at least some of them may be performed by changing the order. For example, in the above-mentioned embodiments, a case where the support material forming composition is ejected after the actual body part forming composition is ejected in the layer formation step of forming an arbitrary layer is representatively described, however, the actual body part forming composition may be ejected after the support material forming composition is ejected, or the actual body part forming composition and the support material forming composition may be ejected simultaneously.

Further, in the above-mentioned embodiments, a case where in the bonding step, the bonding of the particles contained in the actual body part forming composition is performed, but the bonding of the particles contained in the support material forming composition is not performed is mainly described, however, in the bonding step, the bonding of the particles contained in the support material forming composition may be performed along with the bonding of the particles contained in the actual body part forming composition.

Further, in the above-mentioned embodiments, a case where not only the actual body part forming composition, but also the support material forming composition to be used for forming the support material contains particles and a solvent which functions as a dispersion medium for dispersing the particles is representatively described, however, the support material forming composition may not contain particles.

Further, in the above-mentioned embodiments, a case where the support material forming composition is used along with the composition to be used for forming the actual body part of the three-dimensional shaped article (actual body part forming composition) is representatively described, however, in the invention, the support material forming composition may not be used according to the shape or the like of the three-dimensional shaped article to be produced.

Further, in the production method according to the invention, a pre-treatment step, an intermediate treatment step, or a post-treatment step may be performed as needed.

Examples of the pre-treatment step include a stage cleaning step.

Examples of the post-treatment step include a washing step, a shape adjustment step in which deburring or the like is performed, a coloring step, a coating layer formation step, and a heating treatment step for increasing the bonding strength between the particles.

Further, in the case where the composition contains a binder, a binder removal step may be further included as a step separately from the bonding step. More specifically, for example, for a stacked body in which a plurality of layers are stacked, before performing the bonding step (sintering step), a degreasing step may be included as the binder removal step.

Further, in the above-mentioned embodiments, a case where all the above-mentioned steps are performed in the same apparatus (three-dimensional shaped article production apparatus) is representatively described, however, some of the steps of the three-dimensional shaped article production method may be performed in another apparatus. For example, the bonding treatment (sintering treatment) for the stacked body may be performed using an apparatus (a sintering furnace or the like) which is different from the apparatus for performing the formation of the layers and the measurement of the heights of the layers.

The entire disclosure of Japanese Patent Application No. 2016-043674, filed Mar. 7, 2016 is expressly incorporated by reference herein.

What is claimed is:

1. A three-dimensional shaped article production method for producing a three-dimensional shaped article, the method comprising:
   a layer formation step of forming a layer by ejecting a composition containing particles and a solvent in a predetermined pattern using a dispenser;
   a measurement step of determining a height of the layer;
   a repeating step of repeating the layer formation step and the measurement step for several times so as to form a stacked body including a plurality of the layers;
   a bonding step of subjecting the stacked body to a bonding treatment for bonding the particles in the plurality of the layers;
   a driving waveform data selection stop of selecting driving waveform data for the dispenser for ejecting the composition from a data group including a plurality of pieces of driving waveform data based on the height of an n-th layer which is positioned in a n-th position among the plurality of the layers, where the n represents an arbitrary integer of 1 or more, the driving waveform data including reference driving waveform data, first driving waveform data, and the second driving waveform data,
   wherein an ejection amount of the composition per unit area onto the n-th layer in the layer formation step of forming an (n+1)th layer which is located in the (n+1)th position of the plurality of the layers is adjusted,
   when the reference driving waveform data is selected, the ejection amount of the composition per unit area is a reference amount,
   when the first driving waveform data is selected the ejection amount of the composition per unit area is a first amount that is less than the reference amount,
   when the second driving waveform data is selected, the ejection amount of the composition per unit area is a second amount that is more than the reference amount,
   in the measurement step, a plurality of the heights are measured at a plurality of positions on the n-th lever the plurality of positions are located in an area on which the (n+1)th layer is formed, when a first height of the plurality of heights corresponding to a first position of the plurality of positions on the n-th layer corresponds to a predetermined value, the reference driving waveform data is selected in the driving waveform data selection step so that the dispenser ejects the reference amount of the composition per unit area at a position corresponding to the first position for forming the (n+1)th layer, when a second height of the plurality of heights corresponding to a second position of the plurality of positions on the n-th layer is more then the predetermined value, the first driving waveform data is selected in the driving waveform data selection step so that the dispenser elects the first amount of the composition per unit area at a position corresponding to the second position for forming the (n+1)th layer, and when a third height of the plurality of heights corresponding to a third position of the plurality of positions on the n-th layer is less than the predetermined value, the second driving wave-form data is selected in the driving waveform data selection step so that the dispenser ejects the second amount of the composition per unit area at a position corresponding to the third position for forming the (n+1)th layer.

2. The three-dimensional shaped article production method according to claim 1,
wherein a film thickness becomes a desired film thickness with the n-th layer and the (n+1)th layer when the ejection amount of the composition per unit area is adjusted by using one of the reference driving waveform data, the first driving waveform data, and the second driving waveform data based on the plurality of the heights at the plurality of positions on the n-th layer that are measured in the measurement step.

3. The three-dimensional shaped article production method according to claim 1, further comprising:
a solvent removal step of removing the solvent from the layer after the layer formation step is performed,
wherein the measurement step for the n-th layer is performed after the solvent removal step of removing the solvent from the n-th layer is performed.

4. The three-dimensional shaped article production method according to claim 1, wherein the composition further contains a binder having a function to temporarily bond the particles in the layer in which the solvent has been removed.

5. The three-dimensional shaped article production method according to claim 1, wherein the particles in the composition include a material containing at least one of a metal material and a ceramic material.

* * * * *